(12) United States Patent
Sonnen et al.

(10) Patent No.: US 11,402,065 B2
(45) Date of Patent: Aug. 2, 2022

(54) POLAR CAP-REINFORCED PRESSURE CONTAINER

(71) Applicant: NPROXX B.V., Heerlen (NL)

(72) Inventors: Michael Sonnen, Duisburg (DE); Frank Otremba, Stolberg (DE); Thomas Bäumer, Hueckelhoven (DE); Christian Middendorf, Aachen (DE); Heinz-Willi Bickendorf, Bedburg (DE)

(73) Assignee: NPROXX B.V., RK Heerlen (DE)

( * ) Notice: Subject to any disclaimer, the term of this patent is extended or adjusted under 35 U.S.C. 154(b) by 110 days.

(21) Appl. No.: 16/614,641

(22) PCT Filed: May 8, 2018

(86) PCT No.: PCT/EP2018/061774
§ 371 (c)(1),
(2) Date: Nov. 18, 2019

(87) PCT Pub. No.: WO2018/210606
PCT Pub. Date: Nov. 22, 2018

(65) Prior Publication Data
US 2020/0240586 A1 Jul. 30, 2020

(30) Foreign Application Priority Data
May 19, 2017 (DE) ...................... 10 2017 208 492.8

(51) Int. Cl.
*F17C 1/06* (2006.01)
*F17C 1/16* (2006.01)
*B29C 53/60* (2006.01)
(52) U.S. Cl.
CPC .............. *F17C 1/06* (2013.01); *B29C 53/602* (2013.01); *F17C 1/16* (2013.01);
(Continued)

(58) Field of Classification Search
None
See application file for complete search history.

(56) References Cited

U.S. PATENT DOCUMENTS 2,715,377 A 8/1955 Gary, Jr.
2,744,043 A 5/1956 Ramberg
(Continued)

FOREIGN PATENT DOCUMENTS

DE 202016100754 U1 3/2016

OTHER PUBLICATIONS

Leavitt, et al, Development of Advanced Manufacturing Technologies for Low Cost Hydrogen Storage Vessels, 2013 DOE Hydrogen Program, Project ID # MN008, May 15, 2013, pp. 1-23.*
(Continued)

*Primary Examiner* — Jeffry H Aftergut
(74) *Attorney, Agent, or Firm* — Tarolli, Sundheim, Covell & Tummino LLP

(57) ABSTRACT

The invention relates to a method for manufacturing a fibre-reinforced pressure vessel having fibre-reinforced polar caps as well as a corresponding pressure vessel having these polar caps. Therein, the method comprises the steps of applying fibre composite material onto a provided winding body having the shape of the polar caps at at least one of the ends, using a winding process; of intermediately curing the fibre composite material for dimensional stabilisation, said fibre composite material, however, subsequently still remaining chemically active for later cross-linking; of severing the fibre composite material for producing a polar cap reinforcing layer which is detached from the winding body and placed onto a liner underlay of the pressure vessel. Subsequently, the polar cap reinforcing layer is cross-linked with the fibre composite material of the pressure vessel for producing the pressure vessel reinforcing layer.

15 Claims, 5 Drawing Sheets

(52) U.S. Cl.
CPC .................. *F17C 2201/056* (2013.01); *F17C 2203/0604* (2013.01); *F17C 2203/066* (2013.01); *F17C 2209/2154* (2013.01); *F17C 2209/234* (2013.01); *F17C 2270/0168* (2013.01)

(56) References Cited

U.S. PATENT DOCUMENTS

| | | | | |
|---|---|---|---|---|
| 3,293,860 A | * | 12/1966 | Stedfeld | F02K 9/34 60/263 |
| 4,881,998 A | * | 11/1989 | Youngkeit | B29C 53/605 156/173 |
| 5,648,138 A | * | 7/1997 | Tingley | B29C 70/025 428/105 |

OTHER PUBLICATIONS

Office Action issued in the corresponding Indian patent application 201917051421 dated Feb. 8, 2022.

\* cited by examiner

POLAR CAP-REINFORCED PRESSURE CONTAINER

RELATED APPLICATIONS

The present invention is a U.S. National Stage under 35 USC 371 patent application, claiming priority to Serial No. PCT/EP2018/061774, filed on 8 May 2018; which claims priority of DE 10 2017 208 492.8, filed on 19 May 2017, the entirety of both of which are incorporated herein by reference.

FIELD OF THE INVENTION

The invention relates to a method for manufacturing a fibre-reinforced pressure vessel having fibre-reinforced polar caps as well as a corresponding pressure vessel having these polar caps.

BACKGROUND OF THE INVENTION

The market for fibre-reinforced pressure vessels made of fibre composite material is continuously growing. The increasing production of natural gas and fracked gas requires their storage in pressure vessels, especially in countries without an appropriate pipeline system. In addition, the automotive industry which is heavily involved in the development of fuel cell vehicles requires that the fuel should be stored in pressure vessels in the form of gaseous hydrogen under high pressure. As regards the transport of the pressure vessels, it is desired that they should be light-weight pressure vessels because transporting heavy-weight pressure vessels is associated with the consumption of an unnecessarily high amount of energy, thus causing excessively high transport costs.

Pressure vessels presently in use have a cylindrical central part on the two sides of which polar caps are provided for closing the central part; such pressure vessels are, for example, produced using a fibre winding method. Therein, use is made of a liner (inner container for the pressure vessel) which, on the one hand, acts as a winding core and, on the other hand, ensures the tightness of the vessel. To manufacture the pressure vessel, this liner is overwrapped with fibre composite material to reinforce it, in order to ensure that the resulting pressure vessel obtains its stability. The liners used for type 3 pressure vessels are made of metal, e.g., aluminium or steel, those for type 4 pressure vessels are made of plastic. Therein, the outer layer comprises both circumferential layers and what are called helical layers to provide pressure strength in both radial and axial directions. The fibres in the circumferential layers have a tangential fibre direction to provide pressure strength in circumferential direction in the cylindrical part of the pressure vessel. The helical layers provide axial pressure strength of the pressure vessel in its central part but also envelop the polar caps for absorbing the internal pressure in this region.

Therein, winding the fibres by means of helical layers for reinforcing the polar caps of the pressure vessel requires more fibre material than would be necessary for reinforcing the cylindrical central part axially. However, a continuous winding process involves placing the helical layers continuously over the polar caps and over the central part, whereby a lot of fibre material has to be used in the central part.

As an alternative, the polar caps can also be reinforced by placing pre-impregnated fibre sections (so-called prepregs) which are used to subsequently overwrap the complete pressure vessel with a thin layer thickness of helical layers. However, this process is complex in terms of cost and time and, thus, disadvantageous as well.

It would therefore be desirable to have pressure vessels and a corresponding method of manufacturing the same with which the polar caps of a pressure vessel can be efficiently reinforced both cost-effectively and time-favourably using as small an amount of fibre composite material as possible.

SUMMARY OF THE INVENTION

It is therefore the object of the invention to provide a pressure vessel and a corresponding method of manufacturing said pressure vessel with which the polar caps of the pressure vessel can be efficiently reinforced both cost-effectively and time-favourably using as small an amount of fibre composite material as possible.

This object is achieved by means of a method for manufacturing a reinforced pressure vessel having a cylindrical central portion and polar caps closing said central portion on both sides, comprising a liner underlay and fibre composite material applied onto the liner underlay as a pressure vessel reinforcing layer, the method comprising the steps of:

providing a first winding body which comprises at least one dome-shaped end corresponding to a shape of the liner underlay of the polar caps and a cylindrical central part layer;

applying the fibre composite material at least onto the end and the central part layer of the first winding body, using a winding process;

using a suitable intermediate hardening process for stabilising the shape of the wound fibre composite material;

severing at least the fibre composite material between the end and the central part layer, for example, at the transition from the end to the central part layer, using a suitable severing process for producing a polar cap reinforcing layer;

optionally machining the edge regions of the cutting areas for enlarging the contact surfaces for the later overwrapping and the corresponding shaping of the contact surface for stress-compliant load transfer between the polar cap reinforcement and the later overwrapping during production of the later pressure vessel;

detaching the polar cap reinforcement layer from the first winding body and placing the detached polar cap reinforcing layer onto the respective liner underlay of the polar cap of the later pressure vessel;

applying the fibre composite material onto the liner superimposed with the separately produced polar cap reinforcing layers, using a winding process; and cross-linking the polar cap reinforcing layer and the further fibre composite material.

In general, the fibre composite material is composed of two main components, which are fibres herein, embedded in a matrix material which creates the strong bond between the fibres. Therein, the fibre composite material can be wound from one fibre or from a plurality of fibres, wherein the fibre(s) is/are wound closely next to each other in contact with each other. This results in a fibre layer, wherein the fibres are wound onto this fibre layer in further fibre layers until the fibre composite material has the desired thickness and represents a corresponding reinforcing layer having this thickness. In one embodiment, the pressure vessel reinforcing layer comprises first and further fibres, for example, second fibres, in a plurality of fibre layers. The composite gives the fibre composite material properties of a higher quality, such as high strength, than any of the two individual components involved could provide. The reinforcing effect of the fibres in the fibre direction is achieved when the modulus of elasticity of the fibres in the longitudinal direction is in excess of the modulus of elasticity of the matrix material, when the elongation at break of the matrix material is in excess of the elongation at break of the fibres and when the breaking strength of the fibres is in excess of the breaking strength of the matrix material. The fibres that can be used can be fibres of any kind, for example, glass fibres, carbon fibres, ceramic fibres, steel fibres, natural fibres, or synthetic fibres. The matrix materials used can, for example, be duromers, elastomers, or thermoplasts. The material properties of the fibres and the matrix materials are known to the person skilled in the art, with the result that the person skilled in the art can select a suitable combination of fibres and matrix materials for producing the fibre composite material for the particular application. Herein, individual fibre layers in the fibre composite region can comprise a single fibre or a plurality of equal or different fibres.

Cylindrical pressure vessels comprise a cylindrical part, referred to as central portion herein, which typically has a circular cross-sectional area perpendicular to the cylinder axis. To ensure that pressurised gas can be stored in this pressure vessel, the cylindrical surfaces of the central portion are closed with dome-shaped cover surfaces, i.e., the polar caps. These geometrical considerations apply equally to pressure vessels consisting of an inner container, the so-called liner, and an outer layer wound over the inner container (liner), the so-called pressure vessel reinforcement layer, to reinforce the inner container (liner) so that the resulting pressure vessel obtains its stability. The liner used in type 3 pressure vessels is made of metal, e.g., aluminium or steel, that used in type 4 pressure vessels is made of plastic. The pressure vessel reinforcing layer is used for providing the required stability of the pressure vessel, in particular in the case of plastic liners. Since the inner container is used as an underlay for the pressure vessel reinforcing layer, it is also referred to as liner underlay in the following. On the one hand, such containers have a very low weight, which is important, for example, for applications in means of transport, and on the other hand, gases such as hydrogen can be stored under high pressure with low losses, since suitable plastics have very low hydrogen permeability and the required strength is provided by the pressure vessel reinforcing layer that is made of fibre composite material. The pressure vessel according to the invention thus comprises a liner underlay as an inner container with dome-like cover surfaces, i.e., the polar caps, preferably with a shape deviating from a hemisphere, which in the edge region adjacent to the cylindrical central part of the inner container has a greater curvature with respect to a hemispherical surface, while the central region of the polar cap has a lesser curvature with respect to a hemispherical surface. Such a polar cap that is particularly suitable has the shape of an isotensoid. Therein, an isotensoid refers to a shape which, in a polar cap reinforcing layer made of fibre composite material wound thereon, causes a constant tension in the fibre in all points of the run of the fibre.

In order to additionally reinforce the polar cap with a fibre composite material as polar cap reinforcing layer, the polar cap reinforcing layer is prefabricated separately from the pressure vessel and the liner underlay. The first winding body used for this purpose makes it possible to produce the polar cap reinforcing layer with the desired mechanical properties and with little material input, since essentially only the ends of the winding body are overwrapped here and the central part support of the first winding body (and possibly a further end on the other side of the central part support) is only used for returning the fibre material for further overwrapping of the end.

Herein, the term "first winding body" refers to the winding body on which the polar cap reinforcing layer is produced. The second winding body refers to the liner underlay in the central portion with placed polar cap reinforcing layers in the polar cap area.

The polar cap reinforcing layer that is to be subsequently placed onto the liner underlay is only prefabricated to such an extent that it will be possible to detach it from the first winding body in a dimensionally stable manner. The cross-linking capability of the polar cap reinforcing layer can be maintained after intermediate curing, allowing stable cross-linking with the later applied fibre composite material of the pressure vessel, in order to produce the final pressure vessel reinforcing layer for the entire pressure vessel. The polar cap reinforcing layer can also be covered with a structuring material while it is being produced, said structuring material being removed again after the intermediate curing process in order to allow good bonding with the fibre composite material of the pressure vessel applied later.

To achieve this, the intermediate curing process is carried out at a temperature and with a process duration suitable for the matrix material. The intermediate curing process can be carried out such that the matrix material subsequently still remains chemically reactive.

The polar cap reinforcing layer produced on the first winding body is severed after the intermediate curing process so that it can be removed from the first winding body. Herein, the wall thickness of the polar cap reinforcing layer can be reduced towards the cutting plane by mechanical machining in order to enable a larger contact surface of the cutting area with the reinforcing material to be applied later, or also to influence the contour of the surface of the liner to be wound later in a suitable way so that peak loads are avoided. Therein, severing can be achieved with any procedure that is suitable for severing fibre composite material, for example, by sawing, turning or water jet cutting. Herein, it is only the wound fibre composite material on the winding body that can be severed, so that the winding body can be reused thereafter. As an alternative, however, it is also possible to sever the entire winding body including the fibre composite material wound thereon, in order to subsequently detach the polar cap reinforcing layer thus produced from the remainder of the winding body.

Any remaining severing edge between the polar cap reinforcing layer and the reinforcing layer applied later is filled with matrix material or fibre composite material and eliminated by the final cross-linking of the matrix materials of both reinforcing layers with the result that a common pressure vessel reinforcing layer is created. Therein, the final cross-linking process is carried out with parameters suitable for the matrix. By producing the polar cap reinforcing layer separately, the fibre run that is ideal for reinforcing the polar caps can be achieved during the winding process of the polar cap reinforcing layer.

By providing the polar cap reinforcement, the helical layers of the fibre composite layer that are applied later may be made thinner in the central region than they would have to be wound onto the pressure vessel in other cases.

The method according to the invention thus provides a pressure vessel manufacturing method which allows reinforcing the polar caps of the pressure vessel efficiently, cost-effectively and time-favourably using as small an amount of fibre composite material as possible.

In one embodiment of the method, the fibre composite material is applied onto the first winding body such that the polar cap reinforcing layer comprises first fibre layers with a first winding direction of fibres of the fibre material of less than 20 degrees, for example, tangentially down to the boss, and/or second fibre layers with a second winding direction of the fibres of between 20 and 80 degrees, preferably 65 to 75 degrees, in each case relative to the cylinder axis of the central part support. Herein, the cylinder axis of the winding body corresponds to the cylinder axis of the later pressure vessel. The fibre directions in the first fibre layers cause a good reinforcement of the polar cap reinforcing layer in the central region of the polar caps, i.e., around the cylinder axis. The fibre directions in the second fibre layer cause a good reinforcement of the polar cap reinforcing layer in the marginal regions of the polar cap adjacent to the central portion of the pressure vessel. Depending on the shape of and the pressure conditions within the pressure vessel, the polar cap reinforcing layer may consist only of the first or second fibre layers or of a combination of first and second fibre layers which may, for example, be arranged in an alternating layer sequence in the polar cap reinforcing layer.

In one embodiment, the first fibre layers are applied all-over the ends of the first winding body in order to provide a closed polar cap reinforcing layer which can be well cross-linked with the central portion reinforcing layer at the edge region of the polar cap.

In a further embodiment, the second fibre layers are applied over and beyond the ends of the first winding body in one or more limited regions only. Preferably, at least one of the limited regions covers the central support and an edge region of the ends adjacent to the central part support. The central part support must be covered to ensure a continuous winding procedure. After the fibre composite layer has been severed, the covered regions are thus arranged in the edge region of the polar cap, where the fibre run of the second fibre layers causes an optimal reinforcement.

In a further embodiment of the method, the steps of applying the fibre material comprises the following steps:
  applying one or more first fibre layers onto the first winding body;
  applying one or more second fibre layers onto the first fibre layers;
  preferably overwrapping the preceding first and/or second fibre layers with one or more further first fibre layers. This layer sequence ensures that both the central region of the polar caps in their middle and the edge region adjacent to the central portion of the pressure vessel can be perfectly reinforced using a small amount of fibre composite material.

In a further embodiment of the method, one end having a shape that corresponds to the liner underlay of the polar caps is arranged on each of the two sides of the central part support. The cylindrical central part support of the winding body, which connects the two ends to each other, has a length along a cylinder axis of the central part support that is less than the height of the dome-shaped ends of the cylinder axis. After the wound fibre composite material forming the polar cap reinforcing layer has been severed for detaching it from the winding body, there will be only a small amount of fibre composite material waste on the remaining central part support. In a preferred embodiment, the length LW is one magnitude less than the height HP, and the winding process for applying the fibre composite material is carried out over and beyond both ends. This can avoid waste if necessary, since the length of the central part support just corresponds to the cutting width during the severing and possible machining processes with a suitable contour for better force transmission to the fibre composite layer to be applied further during the manufacture of the pressure vessel. In a further embodiment, the length of the central part support is therefore adjusted such that the step of severing the fibre composite material results in the production of two separate polar cap reinforcing layers without producing waste therein.

In a further embodiment of the method, said method comprises the additional step of mechanically removing fibre composite material above the central part support and in the regions adjacent thereto over the end(s) of the first winding body, said additional step being carried out between the steps of using the intermediate curing process and severing at least the fibre composite material, wherein the later polar cap reinforcing layer is provided with an outer layer which in the regions subjected to the removal runs at least partially parallel to the cylinder axis. The mechanical removal already prepares the corresponding region of the later polar cap reinforcing layer for the step of overwrapping the central portion reinforcing layer with fibre composite material. The regions created by the removal parallel to the cylinder axis can be overwrapped without the risk of the overwrapped fibre composite material getting out of place. The fibre direction of the fibre composite material of the central portion reinforcing layer, which is wound over the removed regions, essentially has a tangential orientation, i.e., a fibre angle of more than 80 degrees relative to the cylinder axis of the pressure vessel. It therefore represents a perfect reinforcing layer for the edge regions of the polar cap. In these cases, the polar cap reinforcing layer itself does not have to comprise second fibre layers in the edge region of the polar cap adjacent to the central portion of the pressure vessel.

In an alternative embodiment, the method comprises the additional step of mechanically removing fibre composite material over the central part support and in the adjacent regions over the end(s) of the first winding body, said additional step being carried out between the steps of using the intermediate curing process and severing at least the fibre composite material, wherein the later polar cap reinforcing layer is provided with an outer layer which in the regions subjected to the removal runs at least partially at an angle greater than 0 degree, for example slanted or also perpendicular to the cylinder axis.

In a further embodiment, the method comprises the further step of overwrapping the polar cap reinforcing layer in regions of the polar cap reinforcing layer adjacent to the central portion, which permit non-skid overwrapping with a fibre direction of more than 80 degrees relative to the cylinder axis of the central portion.

In a further embodiment, the method comprises the further step of overwrapping the polar cap reinforcing layer and the central portion with further fibre composite material. All fibre angles can be used here: small fibre angles which superimpose the entire surface of the polar cap reinforcing layer similar to the first fibre layer, greater fibre angles which do not superimpose the entire surface of the polar cap reinforcing layer similar to the second fibre layer, and circumferential layers in excess of 80 degrees relative to the cylinder axis of the central portion, which are placed in the central part and the limited region of the polar cap reinforcing layer.

In a further embodiment of the method, the liner underlay has a shoulder at the transition from the central portion to the polar cap, said shoulder forming a stop for the polar cap reinforcing layer to be placed which is then placed up to the stop at the shoulder. The polar cap reinforcing layer can therefore be placed onto the liner underlay in an easy and stable manner and without the risk of getting out of place.

The invention additionally relates to a pressure vessel having a cylindrical central portion and polar caps closing the central portion on both sides, comprising a liner underlay and a fibre composite material applied to the liner underlay as a pressure vessel reinforcing layer, wherein the polar cap reinforcing layer that is produced as a separate fibre composite material is placed onto the liner underlay and the polar cap reinforcing layer has a severing edge facing the central portion of the pressure vessel, at which severing edge the polar cap reinforcing layer is cross-linked with the other fibre composite material of the central portion of the pressure vessel in mechanical contact with the polar cap reinforcing layer to form the pressure vessel reinforcing layer. The severing edge corresponds to the cutting edge along which the fibre composite material was severed on the winding body. Therein, the severing edge runs either perpendicular or slanted relative to the cylinder axis of the central portion of the pressure vessel, in order to achieve good cross-linking of the polar cap reinforcing layer with the central portion reinforcing layer. If necessary, certain gaps between the reinforcing layers may be subsequently filled with matrix material to ensure complete cross-linking at the severing edge.

In one embodiment, the polar cap reinforcing layer comprises first fibre layers with a first winding direction of the fibres at an angle relative to the cylinder axis of the central portion that is so small that the liner underlay for the polar caps is covered over its entire surface, e.g., less than 20 degrees and, for example, tangentially down to the boss, and/or second fibre layers with a second winding direction of the fibres of between 20 and 80 degrees, preferably 65 to 75 degrees, relative to the cylinder axis of the central portion, which partially covers the liner underlay for the polar caps in one or more limited regions only. As a result, both the central region of the polar cap and its edge region can be perfectly reinforced.

In a further embodiment, the second fibre layers are arranged adjacent to the central portion of the pressure vessel at least in a region of the polar cap. Thereby, the edge regions of the polar cap are perfectly reinforced.

In a further embodiment, the polar cap reinforcing layer comprises one or more first fibre layers in contact with the liner underlay of the polar cap and one or more second fibre layers on the first fibre layer(s). In a preferred embodiment, the preceding first and/or second fibre layers are overwrapped with one or more further first fibre layers. Such sequences of fibre layers in the polar cap reinforcing layer reinforce the polar caps in an especially perfect manner.

In a further embodiment, the liner underlay has a shoulder at the transition from the central portion to the polar cap, which forms a stop for the placed polar cap reinforcing layer. The polar cap reinforcing layer is therefore placed in a stable manner and without the risk of getting out of place and onto the liner underlay.

In a further embodiment, the polar cap reinforcing layer and the central portion of the pressure vessel are overwrapped with further fibre composite material. Therein, all fibre angles can be used: small fibre angles which cover the entire surface of the polar cap reinforcing layer similar to the first fibre layer, greater fibre angles which do not cover the entire surface of the polar cap reinforcing layer similar to the second fibre layer, and circumferential layers in excess of 80 degrees relative to the cylinder axis of the central portion, which are placed in the central part and the limited region of the polar cap reinforcing layer.

In a further embodiment, the polar cap reinforcing layer has an outer layer in a region adjacent to the central portion, said outer layer running parallel to the cylinder axis of the central portion. As a result, the polar cap reinforcing layer can, in one embodiment, be overwrapped with a fibre direction of more than 80 degrees relative to the cylinder axis of the central portion, in a non-skid manner and in regions of the polar cap reinforcing layer that are adjacent to the central portion.

SHORT DESCRIPTION OF THE DRAWINGS

These and other aspects of the invention are illustrated in detail below. In the drawings.

DETAILED DESCRIPTION OF THE EXEMPLARY EMBODIMENTS

Figure 1:
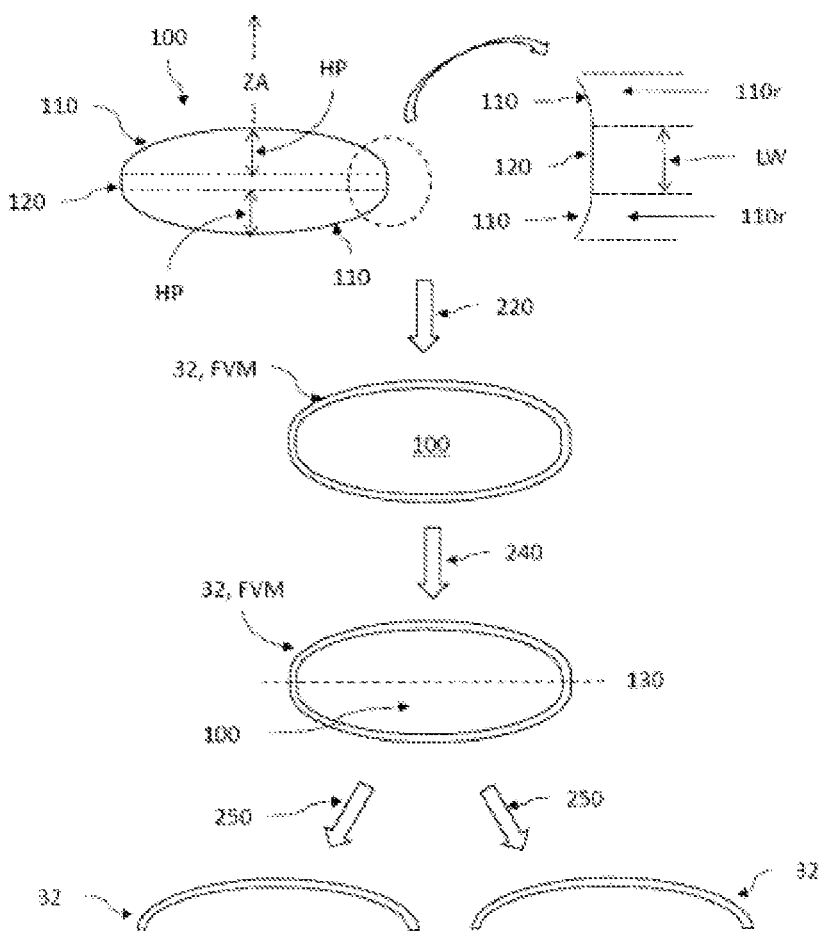
FIG. 1 is a lateral cross-sectional view of an embodiment of the method according to the invention, for individual method steps.

FIG. 1 is a lateral cross-sectional view of an embodiment of the method according to the invention, for individual method steps. In the illustrated instance, the provided first winding body 100 comprises a cylindrical central part support 120 which is enclosed by ends 110 on both sides, said ends 110 having the shape of the liner underlay 2 of the polar caps 12. The cylindrical central part support 120 which connects the two ends 110 to each other has a length LW along a cylinder axis ZA of the central part support that is clearly less than the height HP of the dome-shaped ends 110 along the cylinder axis ZA. For reasons of clarity, however, the length LW is not shown one magnitude smaller than the height HP in the illustrated instance. Therein, the region of the ends 110 adjacent to the central part support 120 is designated as edge region 110r. The winding process for applying 220 the fibre composite material FVM was carried out over and beyond the two ends 110 of the winding body 100. The layer (the later polar cap reinforcing layer 32) that has been dimensionally stabilised by means of an intermediate curing process (not shown in the illustrated instance) and that consists of wound fibre composite material FVM is, in the illustrated instance, severed 240 at the transition between the ends 110 through the central part support 120 along the severing surfaces 130 for producing a polar cap reinforcing layer 32, using a suitable severing method. Subsequently, two separate polar cap reinforcing layers 32 are obtained by detaching 250 the two polar cap reinforcing layers 31 from the winding body 100, said separate polar cap reinforcing layers 32 being thus prepared for being placed onto the liner underlay 2. Due to the shape of the winding body 100, the fibres of the fibre composite material can be wound over the ends 110 with an optimal fibre direction in a continuous process, whereby a high stability and strength of the polar cap reinforcing layers 32 can be obtained with a small layer thickness, thus consuming only a small amount of fibre composite material FVM. Due to the short length of the central part support 120, there is no or only a little amount of waste of fibre composite material after severing, thus considerably reducing the amount of material to be used for a good reinforcement of the polar caps 12.

Figure 2:
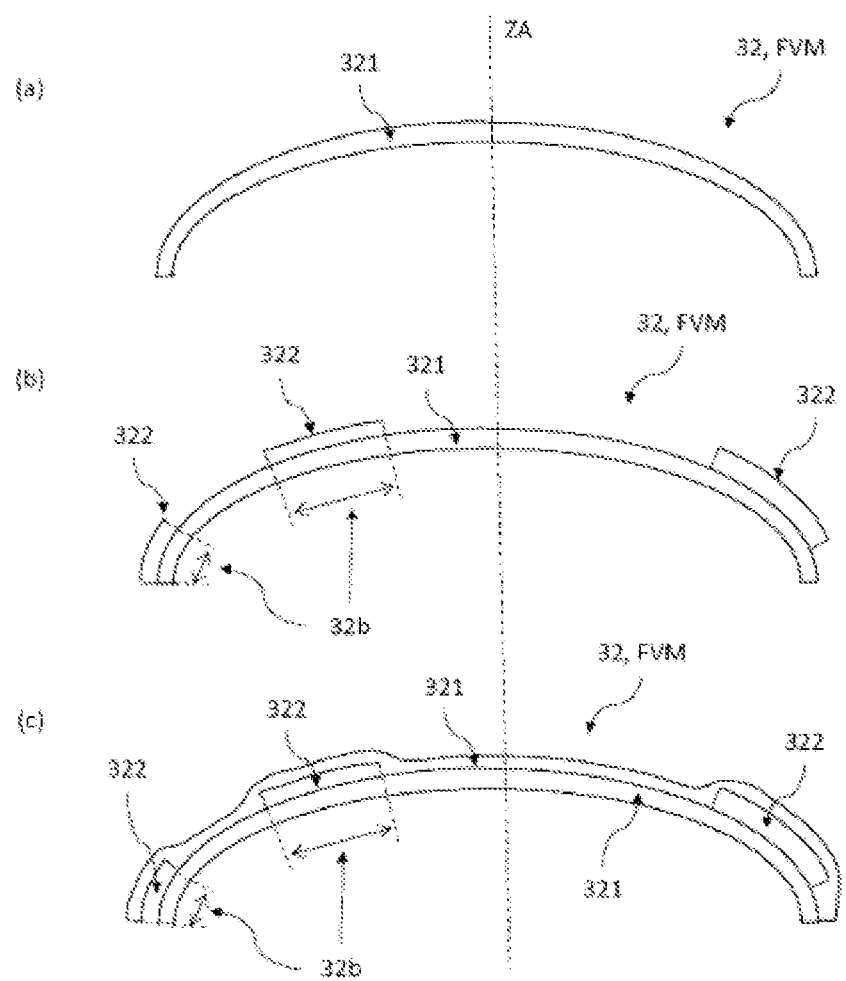
FIG. 2 is a lateral cross-sectional view of various embodiments (a) to (c) of the polar cap reinforcing layer obtained with the method according to the invention.

FIG. 2 is a lateral cross-sectional view of various embodiments (a) to (c) of the polar cap reinforcing cap 32 obtained with the method according to the invention. According to embodiment (a), the polar cap reinforcing layer 32 is formed by first fibre layers 321 with a first winding direction of the fibres of the fibre material FVM at an angle relative to the cylinder axis ZA of the central part support 120 that is so small that they have been applied all-over the ends 110 of the first winding body 100. According to embodiment (b), second fibre layers 322 with a second winding direction of the fibres between 20 and 80 degrees, preferably 65 to 75 degrees, relative to the cylinder axis ZA of the central part support 120 have been applied onto the first fibre layers 321 subsequent to (a). In the illustrated instance, these second fibre layers 322 are applied onto the first fibre layers 321 in three different limited regions 32b only. In the illustrated instance, the concrete regions are shown by way of example for illustrative purposes only. Herein, it is advantageous if at least one of the limited regions 32b covers the edge region 110r of the ends 110 during the winding process. According to embodiment (c), the fibre layers 321, 322 are additionally overwrapped with further first fibre layers 321 subsequent to (b). Such a package of fibre layers 321, 322, 321 represents a particularly robust polar cap reinforcing layer 32.

Figure 3:
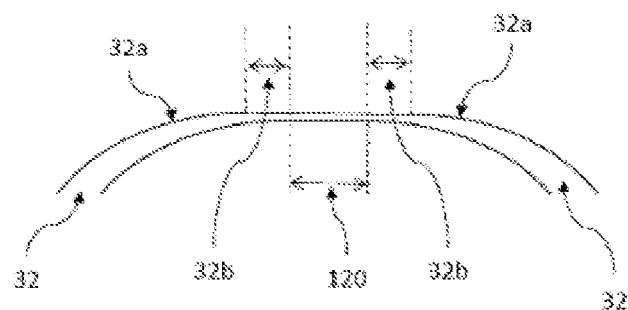
FIG. 3 shows a further embodiment of the polar cap reinforcing layer as to the method according to the invention.

FIG. 3 shows a further embodiment of the polar cap reinforcing layer 32 as to the method according to the invention, wherein fibre composite material FVM was mechanically removed 235 above the central part support 120 and in the regions 32b adjacent thereto over the ends 110 of the first winding body 100. The removal can, for example, be carried out by grinding. To ensure that the material can be precisely removed, this step is only carried out after the intermediate curing process 230 has been carried out on a now dimensionally stable fibre composite material FVM. Thereby, the later polar cap reinforcing layer 32 is provided with an outer layer 32a which, in the illustrated instance, runs parallel to the cylinder axis ZA in the regions 32b subjected to the removal.

Figure 4:
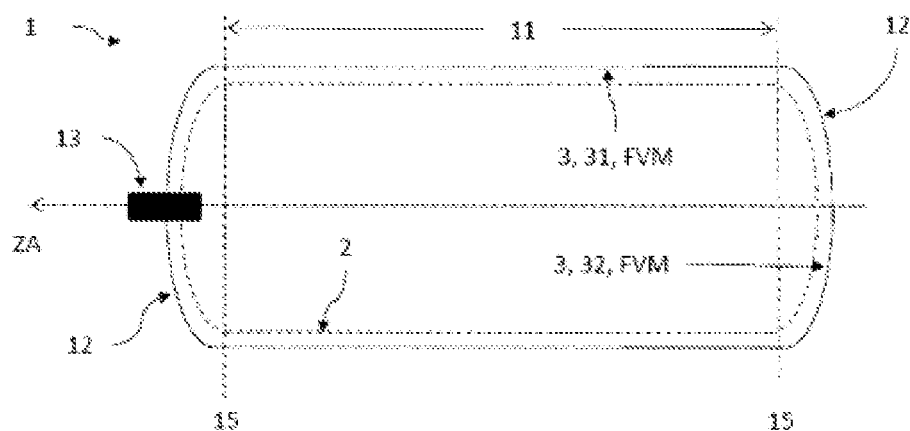
FIG. 4 is a lateral cross-sectional view of an embodiment of the pressure vessel according to the invention.

FIG. 4 is a lateral cross-sectional view of an embodiment of the pressure vessel 1 according to the invention having a cylindrical central portion 11 and polar caps 12 closing the central portion 11 on both sides, comprising a liner underlay 2 and a fibre composite material FVM applied onto the liner underlay 2 as a pressure vessel reinforcing layer 3, wherein the polar cap reinforcing layer 32 that is produced as a separate fibre composite material FVM is applied onto the liner underlay 2 and the polar cap reinforcing layer 32 has a severing edge 15 facing the central portion 11 of the pressure vessel 2, at which severing edge 15 the polar cap reinforcing layer 32 is cross-linked with the other fibre composite material 31 (FVM) of the central portion 11 of the pressure vessel 1 in mechanical contact with the polar cap reinforcing layer 32 to form the pressure vessel reinforcing layer 3. One of the polar caps additionally has a valve 13 for filling the pressure vessel with filling gas and for letting off the filling gas. Therein, the polar cap reinforcing layer 32 can comprise first fibre layers 321 with a first winding direction of the fibres relative to the cylinder axis ZA of the central portion 11 so small that the liner underlay 2 for the polar caps 12 is covered over the entire surface, and/or second fibre layers 322 with a second winding direction of the fibres of between 20 and 80 degrees, preferably 65 to 75 degrees, relative to the cylinder axis ZA of the central portion 12, which partially covers the liner underlay 2 for the polar caps 12 in one or more limited regions 32b (not shown in detail in the illustrated instance) only. Therein, the second fibre layers 322 can be arranged adjacent to the central portion 11 of the pressure vessel 1 at least in a region 32b of the polar cap 12. Therein, the polar cap reinforcing layer 32 can comprise a sequence of fibre layers, as shown in FIG. 2.

Figure 5:
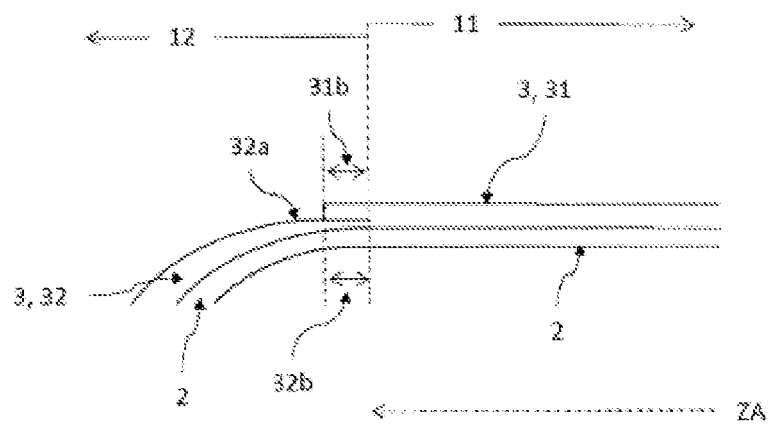
FIG. 5 is a lateral cross-sectional view of a further embodiment of the pressure vessel according to the invention, showing the polar cap reinforcing layer overwrapped in a region adjacent to the central portion.

FIG. 5 is a lateral cross-sectional view of a further embodiment of the pressure vessel 1 according to the invention, showing the polar cap reinforcing layer 32 overwrapped in a region 32b adjacent to the central portion 11. Herein, the polar cap reinforcing layer 32 has an outer layer 32a in a region 32b adjacent to the central portion 11, said outer layer 32a running parallel to the cylinder axis ZA of the central portion 11. This parallel region was produced as described according to FIG. 3. In the illustrated instance, the polar cap reinforcing layer 3 in these regions 32b is provided with a non-skid overwrapping 31b with a fibre direction of more than 80 degrees relative to the cylinder axis ZA of the central portion 11, which improves the cross-linking between the central portion reinforcing layer 31 and the polar cap reinforcing layer and represents an additional reinforcement for the edge region of the polar cap reinforcing layer 31.

Figure 6:
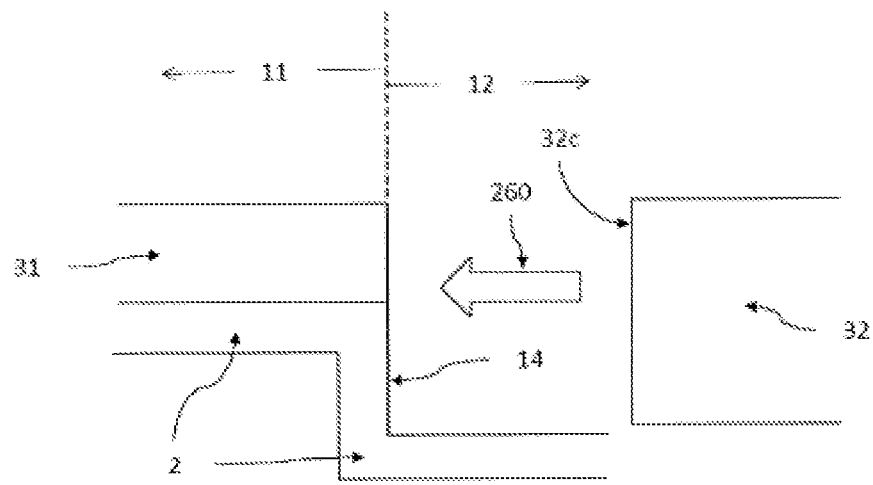
FIG. 6 is a lateral cross-sectional view of a further embodiment of the pressure vessel according to the invention with a shoulder as a stop for the polar cap reinforcing cap.

FIG. 6 is a lateral cross-sectional view of a further embodiment of the pressure vessel 1 according to the invention with a shoulder 14 as a stop for the polar cap reinforcing cap 32. Herein, the liner underlay 2 has this shoulder at the transition from the central portion 11 to the polar cap 12. Therein, the polar cap reinforcing layer 32 is placed 260 up to the stop at the shoulder 14. To ensure good cross-linking with the central portion reinforcing layer 32, the shoulder 14 and the severing surface 32c of the polar cap reinforcing layer 32 should run parallel to each other.

Figure 7:
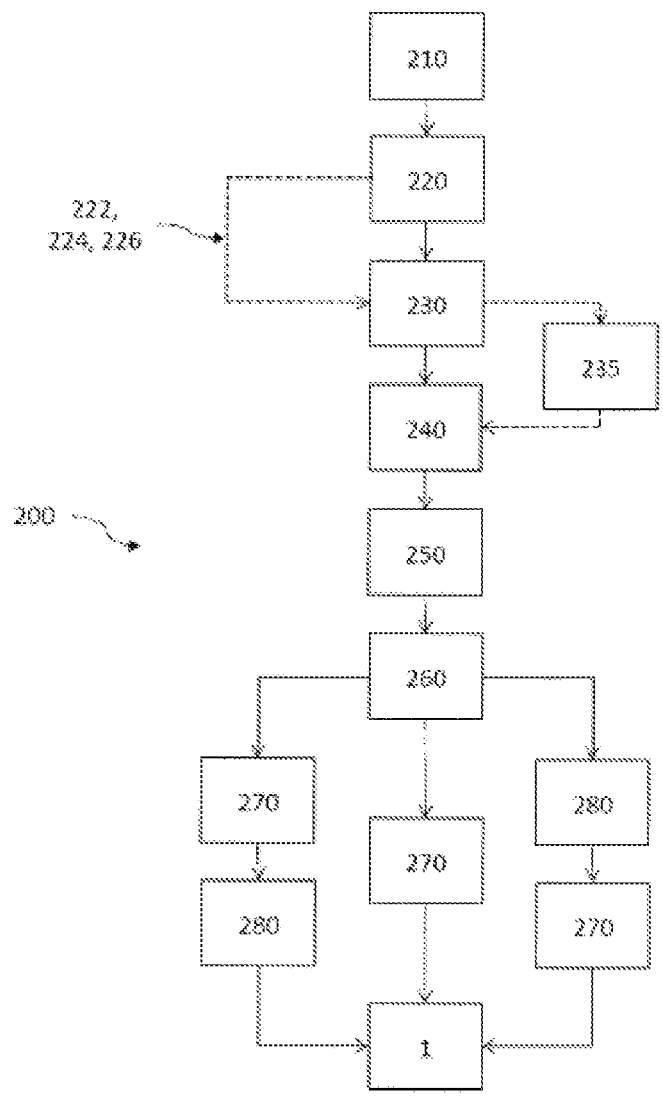
FIG. 7 shows an embodiment of the method according to the invention for manufacturing a reinforced pressure vessel, for example, according to FIG. 4.

FIG. 7 shows an embodiment of a method 200 according to the invention for manufacturing a reinforced pressure vessel 1 according to the invention (see, for example, FIG. 4), comprising the steps of providing 210 a first winding body 100 (see, for example, FIG. 1) and of applying 220 the fibre composite material FVM at least onto the end 110 and the central part support 120 of the first winding body 100, using a winding process. To achieve this, the winding body 100 can comprise an end 110 having a shape corresponding to the liner underlay 2 of the polar caps 12 on each of the two sides of the central part support, which are connected to each other via the cylindrical central part support 120, said central part support having a length LW along a cylinder axis ZA of the central part support 120 that is less than the height HP of the dome-shaped ends 110 along the cylinder axis ZA. Preferably, the length LW is one magnitude less than the height HP, and the winding process for applying 220 the fibre composite material FVM is carried out over and beyond both ends 110. Therein, the applying step 220 can comprise the steps of applying 222 one or more first fibre layers 321 with a first winding direction of fibres of the fibre material (FVM) of less than 20 degrees relative to the cylindrical axis ZA of the central part support 120 onto the first winding body 100 tangentially to the boss, of applying 224 one or more second fibre layers 322 with a second winding direction of fibres of between 20 and 80 degrees, preferably 65 to 75 degrees, relative to the cylinder axis ZA of the central part support 120 onto the first fibre layers 321, and of overwrapping 225 the preceding first and/or second fibre layers 321, 322 with one or more further first fibre layers 321. Herein, the first fibre layers can be applied all-over the ends of the winding body 100. Herein, the second fibre layers 322 can be applied over the ends 110 of the first winding body 100 in one or more limited regions 32b only. Herein, at least one of the limited regions 32b can cover the central support 120 and an edge region 110r of the ends 110 adjacent to the central part support 120. After the fibre composite layer has been wound, a suitable intermediate curing process 230 is used for dimensionally stabilising the wound fibre composite material FVM which, however, is subsequently still chemically active for later cross-linking with another fibre composite material 31. Subsequently, the fibre composite material FVM is severed 240 at least at the transition between the end 110 and the central part support 120 using a suitable severing process for producing a polar cap reinforcing layer 32. Herein, the length LW of the central part support 120 can be adjusted such that the severing step 240 results in the production of two separate polar cap reinforcing layers 32. Depending on the embodiment of the method, the additional step of mechanically removing 235 fibre composite material FVM above the central part support 120 and in the regions 32b adjacent thereto over the end(s) 110 of the first winding body 100 can still be carried beforehand. Thereby, the later polar cap reinforcing layer 32 is provided with an outer layer which at least partially runs parallel, slanted or vertically to the cylinder axis ZA in the regions 32b subjected to the removal. The severing step is followed by the step of detaching 250 the polar cap reinforcing layer 31 from the first winding body 100 and of placing 260 the detached polar cap reinforcing layer 32 onto the respective liner underlay 2 of the polar cap 12 of the pressure vessel 1. If the liner underlay 2 has a shoulder 14 at the transition from the central portion 11 to the polar cap 12, said shoulder 14 forming a stop for the polar cap reinforcing layer 32 to be placed, the step of applying 260 can simply be carried out to the stop at the shoulder 14. Subsequently, the step of cross-linking 270 the polar cap reinforcing layer 32 and the further fibre composite material FVM as the central portion reinforcing layer 31 is carried out. Prior or subsequent to the step of cross-linking 270, an additional step of overwrapping 280 the central portion reinforcing layer 31 in the regions 32b of the polar cap reinforcing layer 32 adjacent to the central portion 11 can be carried out, which permit non-skid overwrapping 280 with a fibre direction of more than 80 degrees relative to the cylinder axis ZA of the central portion 11.

The embodiments shown in the illustrated instance only represent examples of the present invention and must, therefore, not be interpreted as being restricting. Alternative embodiments taken into consideration by the person skilled in the art are likewise comprised in the scope of protection of the present invention.

LIST OF REFERENCE SYMBOLS

1 Pressure vessel
11 Cylindrical central portion of the pressure vessel
12 Dome-shaped polar caps of the pressure vessel
13 Valve
14 Shoulder at the transition from the central portion to the polar cap
15 Severing edge of the polar cap reinforcing layer towards the central portion
2 Liner underlay of the pressure vessel
3 Pressure vessel reinforcing layer
31 Central portion reinforcing layer
31b Non-skid overwrapping of the polar cap reinforcing layer
32 Polar cap reinforcing layer
32a Outer layer of the polar cap reinforcing layer
32b Limited regions of the polar cap reinforcing layer
32c Severing surface of the polar cap reinforcing layer 32
321 First fibre layer
322 Second fibre layer
100 First winding body for the polar cap reinforcing layer
110 One end/both ends of the winding body
110r Edge region of the ends
120 Cylindrical central part support of the winding body
130 Severing surface during the severing step 240
200 Method for manufacturing a reinforced pressure vessel
210 Providing a first winding body
220 Applying the fibre composite material onto the first winding body using a winding process
222 Applying first fibre layers onto the first winding body
224 Applying second fibre layers onto the first fibre layers
226 Overwrapping the first/second fibre layers with further first fibre layers
230 Using a suitable intermediate curing process for dimensionally stabilising the wound fibre composite material
235 Mechanically removing fibre composite material above the central part and in the regions adjacent thereto
240 Severing the fibre composite material for producing a polar cap reinforcing layer
250 Detaching the polar cap reinforcing layer from the first winding body
260 Placing the detached polar cap reinforcing layer onto the respective liner underlay of the pressure vessel
270 Cross-linking the polar cap reinforcing layer and the further fibre composite material (FVM)
280 Non-skid overwrapping of the pressure vessel reinforcing layer in the region 32b with additional fibre composite material
290 Overwrapping the pressure vessel reinforcing layer and the cylindrical central portion of the pressure vessel with additional fibre composite material
FVM Fibre composite material of the pressure vessel reinforcing layer
HP Height of the dome-shaped ends along the cylinder axis
LW Length of the central part support of the winding body
ZA Cylinder axis of the cylindrical central portion of the pressure vessel and the central part support of the winding body

The invention claimed is:

1. A method for manufacturing a reinforced pressure vessel having a cylindrical central portion and polar caps closing said central portion on both sides, comprising a liner underlay and a fibre composite material applied onto the liner underlay as a pressure vessel reinforcing layer, the method comprising the steps of:
   providing a first winding body comprising at least one dome-shaped end corresponding to a shape of the liner underlay of the polar caps and a cylindrical central part support adjacent to the end;
   applying the fibre composite material at least onto the end and the central part support of the first winding body, using a winding process;
   using a suitable intermediate curing process for dimensionally stabilising the wound fibre composite material;

mechanically removing the fibre composite material above the central part support and in regions adjacent thereto over the end(s) of the first winding body;

severing at least the fibre composite material between the end and the central part support using a suitable severing process for producing a polar cap reinforcing layer;

detaching the polar cap reinforcing layer from the first winding body and placing the detached polar cap reinforcing layer onto a respective liner underlay of the polar cap of the pressure vessel;

applying the fibre composite material onto the liner that is superimposed with the separately produced polar cap reinforcing layers using a winding process; and cross-linking the polar cap reinforcing layer and the fibre composite material applied onto the liner that is superimposed with the separately produced polar cap reinforcing layers, wherein the later polar cap reinforcing layer is provided with an outer layer which in the regions subjected to the removal runs at least partially parallel to the cylinder axis, wherein the liner underlay has a shoulder at the transition from the central portion to the polar cap, said shoulder forming a stop for the polar cap reinforcing layer to be placed, wherein the step of placing is carried out to the stop at the shoulder, or comprising the additional step of mechanically removing fibre composite material above the central part support and in the regions adjacent thereto over the end(s) of the first winding body, and wherein the later polar cap reinforcing layer is provided with an outer layer which in the regions subjected to the removal runs at least partially at an angle greater than 0 degrees relative to the cylinder axis.

2. The method in accordance with claim 1, wherein the step of applying the fibre composite material onto the first winding body is carried out such that the polar cap reinforcing layer comprises first fibre layers with a first winding direction of fibres of the fibre material of less than 20 degrees, and/or second fibre layers with a second winding direction of the fibres of between 20 and 80 degrees in each case relative to the cylinder axis of the central part support.

3. The method in accordance with claim 2, wherein the first fibre layers are applied all-over the ends of the first winding body.

4. The method in accordance with claim 2, wherein the step of applying the fibre material comprises:
applying one or more first fibre layers onto the first winding body;
applying one or more second fibre layers onto the first winding body.

5. The method in accordance with claim 1, wherein one of the ends having a shape corresponding to the liner underlay of the polar caps is arranged on each of the two sides of the central part support and the cylindrical central part support connecting the two ends to each other has a length that is less than the height of the dome-shaped ends along the cylinder axis, preferably wherein the length is one magnitude less than the height and the winding process for applying the fibre composite material is carried out over and beyond both ends, preferably wherein the length of the central part support is adjusted such that the step of severing the fibre composite material results in the production of two separate polar cap reinforcing layers.

6. The method in accordance with claim 1, comprising the further step of overwrapping the polar cap reinforcing layer in regions of the polar cap reinforcing layer adjacent to the central portion, which permit non-skid overwrapping with a fibre direction of more than 80 degrees relative to the cylinder axis of the central portion.

7. The method in accordance with claim 1, comprising the further step of overwrapping the polar cap reinforcing layer and the central portion with further fibre composite material.

8. The method in accordance with claim 1, wherein subsequent to the step of severing at least the fibre composite material between the end and the central part support and prior to the step of detaching the polar cap reinforcing layer from the first winding body the edge regions of the cutting areas are machined for enlarging contact surfaces for the later overwrapping and the corresponding shaping of the contact surfaces for stress-compliant load transfer between the polar cap reinforcement and the later overwrapping during production of the later pressure vessel.

9. The method in accordance with claim 2, wherein applying the fibre composite material onto the first winding body is carried out such that the polar cap reinforcing layer comprises first fibre layers with a first winding direction of fibres of the fibre material of less than 20 degrees, and/or second fibre layers with a second winding direction of the fibres of between 65 to 75 degrees in each case relative to the cylinder axis of the central part support.

10. The method in accordance with claim 9, wherein applying the fibre material comprises:
applying one or more first fibre layers onto the first winding body; and
applying one or more second fibre layers onto the first winding body.

11. The method in accordance with claim 3, wherein applying the fibre material comprises:
applying one or more first fibre layers onto the first winding body; and
applying one or more second fibre layers onto the first winding body.

12. The method in accordance with claim 3, wherein the first fibre layers are applied all-over the ends of the first winding body, wherein at least one of the limited regions covers the central support and an edge region of the ends adjacent to the central part support.

13. The method in accordance with claim 12, wherein applying the fibre material comprises:
applying one or more first fibre layers onto the first winding body; and
applying one or more second fibre layers onto the first winding body.

14. The method in accordance with claim 4, wherein applying the fibre material comprises overwrapping the preceding first and/or second fibre layers with one or more further first and/or second fibre layers.

15. The method in accordance with claim 6, comprising the further step of overwrapping the polar cap reinforcing layer and the central portion with further fibre composite material.

* * * * *